United States Patent [19]

Michaud et al.

[11] Patent Number: 4,626,270
[45] Date of Patent: Dec. 2, 1986

[54] NITRIFICATION-INHIBITING AGENT AND PROCESS FOR THE PRODUCTION THEREOF

[75] Inventors: Horst Michaud, Trostberg; Hermann Raveling, Altenmarkt; Joachim von Seyerl, Seeon, all of Fed. Rep. of Germany

[73] Assignee: SKW Trostberg Aktiengesellschaft, Trostberg, Fed. Rep. of Germany

[21] Appl. No.: 653,474

[22] Filed: Sep. 20, 1984

Related U.S. Application Data

[63] Continuation of Ser. No. 420,770, Sep. 21, 1982, abandoned.

[30] Foreign Application Priority Data

Oct. 13, 1981 [DE] Fed. Rep. of Germany ....... 3140817

[51] Int. Cl.$^4$ ............................................... C05C 9/00
[52] U.S. Cl. .......................................... 71/28; 71/30; 71/64.03
[58] Field of Search ................... 71/1, 11, 27, 28, 30, 71/57.6, 64.1, 64.13, 302; 564/104

[56] References Cited

FOREIGN PATENT DOCUMENTS

| | | | |
|---|---|---|---|
| 2531962 | 7/1977 | Fed. Rep. of Germany | 71/902 |
| 0069163 | 6/1978 | Japan | 71/28 |
| 0042903 | 12/1979 | Japan | 71/25 |

*Primary Examiner*—Ferris H. Lander
*Attorney, Agent, or Firm*—Felfe & Lynch

[57] ABSTRACT

The present invention provides an agent for inhibiting the nitrification of nitrogen-containing fertilizers based on dicyandiamide, which comprises 1 to 40% by weight of a fertilizer which is readily soluble in water and/or ammonia.

The present invention also provides a process for the production of this agent, wherein finely particulate dicyandiamide is sprayed with an aqueous solution of a fertilizer which is readily soluble in water and/or ammonia and subsequently dried.

8 Claims, No Drawings

NITRIFICATION-INHIBITING AGENT AND PROCESS FOR THE PRODUCTION THEREOF

This application is a continuation of application Ser. No. 420,770, filed Sept. 21, 1982, now abandoned.

The present invention is concerned with an agent for inhibiting the nitrification of nitrogen-containing fertilizers which, as nitrification-inhibiting active material, contains dicyandiamide, as well as with a process for the production of this agent.

It is known that the ammonia liberated in the soil by the decomposition of nitrogen-containing compounds is subjected to oxidation due to the presence of nitrifying bacteria, this process being called nitrification. The ammonium or amide nitrogen of nitrogen-containing compounds, namely of nitrogen fertilizers, is thereby oxidized by the bacterium Nitrosomonas to give nitrite. The nitrite is then converted by the bacterium Nitrobacter into nitrate, which is easily mobile in the soil and can be lost by leaching out. Thus, nitrification results in considerable losses of nitrogen, which is a serious problem in the case of using nitrogen fertilizers.

It is known that the utilization of nitrogen fertilizers by plants can be improved by adding a nitrification inhibitor to the nitrogen fertilizers. Thus, it is known to add dicyandiamide as a nitrification-inhibiting agent to nitrogen fertilizers which contain the nitrogen in the form of ammonium or amide nitrogen. In this way, the oxidation of ammonium present in the nitrogen fertilizer to nitrite by the bacterium Nitrosomonas is inhibited.

In some cases, however, the use of commercially available dicyandiamide for this purpose comes up against considerable difficulties. Thus, when this material is present in finely particulate form, which is necessary for its use as a fertilizer, it has a deficient flowability and can, therefore, only be measured with difficulty. Furthermore, upon storage, dicyandiamide tends to cake, especially when it is stored in large containers. Since the solubility of dicyandiamide in water and in fertilizer solutions is not especially high, the rate of dissolving of this material upon addition to fertilizer solutions often does not suffice, which is especially due to the fact that this material tends to clump together when added to aqueous solutions.

It is admittedly known that a part of these problems can be overcome by the addition of anticaking agents, for example silicon dioxide, diatomaceous earth, attapulgite and the like. However, in many cases, the content of insoluble materials in the fertilizer is undesirable since, in the case of incorporation into urea prills or in the case of the addition of dicyandiamide to liquid ammonia, these can give rise to difficulties.

Thus, it is an object of the present invention to provide an agent for the inhibition of the nitrification of nitrogen-containing fertilizers which, even when stored in large vessels, does not tend to cake, displays a good flowability, readily dissolves in fertilizer solutions and thereby also does not tend to form clumps and, in addition, has an improved bulk density, an increased hardness and an improved resistance to attrition when present in the form of a granulate.

We have now found that this object can be achieved when 1 to 40% by weight of a fertilizer which is readily soluble in water and/or ammonia is added to an agent based on dicyandiamide.

Thus, according to the present invention, there is provided an agent for inhibiting the nitrification of nitrogen-containing fertilizers based on dicyandiamide, which comprises 1 to 40% by weight of a fertilizer which is readily soluble in water and/or ammonia.

This agent preferably contains 5 to 20% by weight of the fertilizer which is readily soluble in water and/or ammonia.

Fertilizers which are especially preferred according to the present invention include urea, calcium nitrate and ammonium nitrate, which can be used individually or in the form of mixtures.

The agent according to the present invention preferably has such a particle size distribution that more than 95% of the material has a particle size in the range of from 0.1 to 2 mm. However, it is more advantageous to granulate, compress or compact the agent. The agent should thereby preferably have a bulk density of more than 500 g./liter.

We have found that by means of the addition, according to the present invention, of a fertilizer which is readily soluble in water and/or ammonia to the nitrification inhibitor dicyandiamide, a nitrification-inhibiting agent or additive is provided which, when mixed with a nitrogen-containing fertilizer, manifests the desired inhibiting action and possesses the advantage that no foreign or undesired additives are added to the fertilizer mixed with the inhibitor. In the case of the use of the agent according to the present invention in granulated or pressed form, there is thereby achieved a substantial increase of the bulk density and, surprisingly, the hardness and resistance to attrition of the granulated and/or compacted product are increased to a considerable extent.

The present invention also provides a process for producing this agent, wherein finely-particulate dicyandiamide, which preferably has a particle size of less than 0.5 mm., is sprayed with an aqueous solution of a fertilizer which is easily soluble in water and/or ammonia, for example urea and/or calcium nitrate and/or ammonium nitrate, and subsequently dried.

According to a preferred embodiment of the process according to the present invention, the finely-particulate dicyandiamide is granulated with the use of an aqueous solution of a fertilizer which is readily soluble in water and/or ammonia as granulation adjuvant. For this production of the flowable dicyandiamide, the finely particulate starting material is built up in the usual manner on a granulation plate by spraying on the aqueous solution of the fertilizer which is readily soluble in water and/or ammonia, to give a compacted dicyandiamide. With the use of this fertilizer solution there can thereby be produced a more solid, denser and more readily soluble granulate than was previously the case when carrying out the granulation with water.

The following Example is given for the purpose of illustrating the present invention:

EXAMPLE

For comparative purposes, granulated dicyandiamide is formed, on the one hand, with the use of water as granulation adjuvant and, on the other hand, according to the present invention with the use of an aqueous solution of urea as granulation adjuvant. Subsequently, the speed of dissolving, the strength and the bulk density of the granulate obtained is determined.

For the determination of the speed of dissolving, the time is measured which is necessary for the complete dissolving of 2.5 g. of the granulate obtained (particle fraction <0.5 mm.) in 100 g. water at 20° C., while stirring (magnetic stirrer which is operated at a medium speed of rotation).

The assessment of the strength takes place by a comparison of the sieve analysis before and after a dynamic stressing test, which is carried out as follows: a metallic dropping pipe (with a height of 25 cm. and a diameter of 42 mm.) is filled with 50 g. of the granulate obtained. A 500 g. weight is then allowed to drop three times from a height of 20 cm. on to the granulate. From the displacement of the particle spectrum before and after this stressing, the strength of the granulate can be directly assessed.

The bulk density of the granulate is determined by weighing out a volume thereof of 1000 cc., using a measuring cylinder.

The following results are hereby obtained:

(a) Comparison:

200 g. Dicyandiamide are granulated by spraying on 57 g. water, whereafter the granulate obtained is dried in a vacuum at 50° C. The material obtained has a bulk density of about 500 g./liter, in comparison with about 400 g./liter for "normal" dicyandiamide, and a speed of dissolving of about 0.33 g./minute for the particle range of <0.5 mm. The sieve analysis before and after the above-described stressing test gives the following results:

|  | >2 mm. | >1.6 mm. | >1 mm. | >0.5 mm. | >0.25 mm. | <0.25 mm. |
|---|---|---|---|---|---|---|
| before | 0.0 | 1.8 | 10.0 | 57.8 | 24.4 | 6.0 |
| after | 0.0 | 1.0 | 8.0 | 27.0 | 51.2 | 12.8 |

(b) According to the present invention 200 g. Dicyandiamide are granulated with 53 g. of a 40% aqueous urea solution. The granulate obtained has a bulk density of about 530 g./liter and a urea content of about 8.4% by weight. The speed of dissolving is about 0.56 g./minute for the particle fraction <0.5 mm. In the following Table, there are given the results of the sieve analysis before and after carrying out the above-described stressing test:

|  | >2 mm. | >1.6 mm. | >1 mm. | >0.5 mm. | >0.25 mm. | <0.25 mm. |
|---|---|---|---|---|---|---|
| before | 0.2 | 0.6 | 5.6 | 40.2 | 41.8 | 11.6 |
| after | 0.0 | 0.6 | 4.4 | 36.6 | 45.2 | 13.2 |

The above results clearly show that the agent according to the present invention has a higher bulk density and possesses a clearly higher strength and a surprisingly improved rate of dissolving than the comparison material.

It will be understood that the specification and examples are illustrative but not limitative of the present invention and that other embodiments within the spirit and scope of the invention will suggest themselves to those skilled in the art.

What is claimed is:

1. An agent based on dicyandiamide for use with nitrogen-containing fertilizers to inhibit nitrification of the fertilizers consisting essentially of
   60 to 99% by weight dicyandiamide and
   40 to 1% by weight of a fertilizer which is readily soluble in water and/or ammonia.

2. The agent of claim 1, wherein the fertilizer contains urea, calcium nitrate, ammonium nitrate or a combination of at least two thereof.

3. The agent of claim 1 or 2 in granulated or pressed form.

4. The agent of claim 1 or 2 having a particle size of from about 0.1 to about 2 mm.

5. The agent of claim 1 or 2 having a bulk density of more than 500 g./liter.

6. A process for the production of an agent according to claim 1 comprising spraying finely particulate dicyandiamide with an aqueous solution of the fertilizer and thereafter drying the mixture.

7. The process of claim 6, wherein the finely particulate dicyandiamide is granulated using an aqueous solution of a fertilizer which is readily soluble in water and/or ammonia.

8. The process of claim 6 or 7 wherein urea and/or calcium nitrate and/or ammonium nitrate is used as the fertilizer.

* * * * *